United States Patent Office 3,041,306
Patented June 26, 1962

3,041,306
BLEND OF A STYRENE COPOLYMER WITH A GRAFT-COPOLYMER OF STYRENE UPON AN ALKYL ACRYLATE POLYMER
Massimo Baer, Longmeadow, Mass., assignor to Monsanto Chemical Company, St. Louis, Mo., a corporation of Delaware
No Drawing. Filed Apr. 24, 1959, Ser. No. 808,563
8 Claims. (Cl. 260—45.5)

This invention relates to novel graft copolymers and to blends of said graft copolymers with other thermoplastic polymers.

It is an object of this invention to provide novel graft copolymers.

Another object of this invention is to provide blends of novel graft copolymers with other thermoplastic polymers.

Other objects and advantages of the invention will be apparent from the following detailed descriptions thereof.

A novel group of graft copolymers has been prepared by polymerizing 50–400 parts of a styrene monomer charge in an aqueous dispersion containing 100 parts of a rubbery acrylate ester polymer. A novel group of polymer blends has been prepared by admixing the above described graft copolymers with certain rigid styrene polymers in such proportions that the rubbery acrylate ester polymer substrate of the graft copolymer constitutes about 5–40% by weight of the polymer blend.

The following examples and descriptions are set forth to illustrate more clearly the principle and practice of this invention to those skilled in the art. Unless otherwise noted, where parts or quantities are mentioned, they are parts or quantities by weight.

Acrylate Ester Latexes A–H

A series of latexes of acrylate ester polymers are prepared employing the polymerization recipe set forth below.

Components: Parts
  Water _____ 300
  Monomers _____ 100
  Sodium lauryl sulfate _____ 3.0
  Potassium persulfate _____ 0.1

The water and sodium lauryl sulfate emulsifier are charged to a pressure-resistant, stirred autoclave and the resulting solution is boiled to remove dissolved oxygen. The emulsifier solution is cooled under nitrogen and the monomers and potassium persulfate are then added to the autoclave. The autoclave is next sealed and polymerization is effected by stirring the reaction mixture for 20 hours at a temperature of 50° C. The conversion of monomers to polymers is about 98%. The acrylate ester latex identification and the monomer charge employed in the preparation thereof are set forth in Table I.

TABLE I

| Acrylate Ester Latex Identification | Monomer Charge | | | |
|---|---|---|---|---|
| | Ethyl Acrylate | n-Butyl Acrylate | n-Octyl Acrylate | Acrylonitrile |
| A | | | 100 | |
| B | | 25 | 75 | |
| C | | 50 | 50 | |
| D | | 75 | 25 | |
| E | | 90 | 10 | |
| F | | 90 | | 10 |
| G | | | 88 | 12 |
| H | 25 | 75 | | |

Graft Copolymers A–L

A series of graft copolymers are prepared by charging styrene monomer mixtures (containing 0.2% of dodecyl mercaptan as a modifier) to one of the above prepared acrylate ester latexes which contains 100 parts of the rubbery acrylate ester polymer. The reaction mixtures are stirred for 18 hours at 50° C. at the end of which time all of the added monomers have polymerized. Two percent of a styrenated phenol antioxidant and 0.2% of a polymerization short stop (both percentages being based on the acrylate ester polymer substrate) are added to each of the aqueous polymer dispersions. The acrylate ester latex employed, the quantity of styrene monomer charge and the composition of the styrene monomer charge are set forth in Table II.

TABLE II

| Graft Copolymer Identification | Acrylate Ester Substrate | Styrene Monomer Charge | |
|---|---|---|---|
| | | Styrene | Alpha-Methylstyrene |
| A | A | 100 | |
| B | B | 100 | |
| C | D | 100 | |
| D | E | 100 | |
| E | F | 100 | |
| F | G | 100 | |
| G | H | 100 | |
| H | C | 100 | |
| I | C | 200 | |
| J | C | 300 | |
| K | C | 400 | |
| L | C | 75 | 25 |

Aliquots of each of the above prepared graft copolymers are recovered from the latexes by drum drying. Graft copolymers A through H and L are stiff rubbers, whereas graft copolymers I, J and K are considerably stiffer and have higher moduli of elasticity. The order of stiffness of these graft copolymers is K>J>I. All of the graft copolymers exhibit excellent stability when exposed to ultraviolet light and/or ozone.

EXAMPLE I

Part A.—Eleven polymer blends are prepared by admixing a latex of a styrene homopolymer of about 60,000 molecular weight with a latex of one of graft copolymers A through J and L and recovering the mixed polymers therefrom by drum drying. The proportions of resin solids employed in the preparation of each of the blends are such that the rubbery acrylate ester polymer substrate of the graft copolymer constitutes 20% by weight of the blend. The composition of the blends is set forth in Table III.

TABLE III

| Blend No. | Graft Copolymer Included in Blend | Parts Graft Copolymer | Parts Styrene Homopolymer |
|---|---|---|---|
| 1 | A | 40 | 60 |
| 2 | B | 40 | 60 |
| 3 | C | 40 | 60 |
| 4 | D | 40 | 60 |
| 5 | E | 40 | 40 |
| 6 | F | 40 | 60 |
| 7 | G | 40 | 60 |
| 8 | H | 40 | 60 |
| 9 | I | 60 | 40 |
| 10 | J | 80 | 20 |
| 11 | L | 40 | 60 |

Injection molded samples of all of the above polymer blends have an Izod impact strength of greater than 1.0 ft. lbs./inch of notch (measured with a notch having a radius of curvature of 0.01″), a tensile strength of greater than 4,000 p.s.i. and a flexural modulus of greater than $3\times10^5$ p.s.i. The polymer blends all show excellent stability when exposed to ultraviolet light and/or ozone.

*Part B.*—For purposes of comparison 8 control polymer blends are prepared by blending a latex containing 80 parts of a styrene homopolymer of about 60,000 molecular weight with a latex containing 20 parts of one of rubbery acrylate ester polymers A through H and recovering the mixed polymers therefrom by drum drying. It will be noted that these polymer blends are similar to those of the polymer blends in Part A above in that they contain 20% by weight of a rubbery acrylate ester polymer. Injection molded samples of all of these control polymer blends have an Izod impact strength of less than 0.5 ft. lb./inch, which is less than half the values obtained with the polymer blends of Part A above.

The graft copolymers of the invention are prepared by polymerizing about 50–400 and preferably 50–150 parts by weight of a styrene monomer charge in an aqueous dispersion containing 100 parts by weight of a rubbery acrylate ester polymer.

The styrene monomer charge employed in the preparation of the graft copolymer will consist of about 70–100% by weight of styrene, a ring-alkylstyrene or a mixture thereof and, correspondingly, about 30–0% by weight of an alpha-alkylstyrene, an alpha-alkyl-, ring-alkylstyrene, a 1,3-acyclic diene hydrocarbon or a mixture thereof. Examples of the ring-alkylstyrenes which can be employed as the predominant monomer of the styrene monomer charge, either alone or in admixture with styrene monomer, include o-, m- and p-methylstyrenes, o-, m-, and p-ethylstyrenes, 2,4-dimethylstyrene, 2,4-diethylstyrene, 2-methyl-4-ethylstyrene and the like. Examples of monomers that may be included in the styrene monomer charge in minor proportions include alpha-methylstyrene, alpha-ethylstyrene, alpha-methyl-2-methylstyrene, alpha-methyl-4-methylstyrene, alpha-methyl-2,4-dimethylstyrene, butadiene, isoprene, 2,3-dimethylbutadiene, piperylene and the like.

To prepare the graft copolymers, the styrene monomer charge is added to the aqueous dispersion of the rubbery acrylate ester polymer and the resulting mixture is agitated and heated to a temperature at which the polymerization initiator present in the system initiates the polymerization of the added monomers. If desired, fresh polymerization initiator can be added to the polymerization system with the styrene monomer charge, although this further addition of polymerization initiator is usually not required. In most cases, the residual polymerization initiator employed in the polymerization of the rubbery acrylate ester polymer and/or the radicals present on the rubbery acrylate ester polymer chains are sufficient to initiate the polymerization of the added monomers. It is preferred not to add additional emulsifying agents to the polymerization system and by carrying out the polymerization in this manner substantially all of the added monomers become dispersed in the previously formed rubbery acrylate ester polymer particles and the efficiency of the grafting reaction is very high. If desired, small quantities of polymerization modifiers such as long-chain alkyl mercaptans may be added to the polymerization with the styrene monomer charge so as to regulate and control the molecular weight of the final graft copolymer.

The substrates of the graft copolymers are polymers of 80–100% by weight of an alkyl acrylate in which the alkyl group contains 2–18 carbon atoms and, correspondingly, 20–0% by weight of a vinylidene monomer interpolymerizable therewith. Although any alkyl acrylate monomer falling within the above description can be employed, it is preferred to employ alkyl acrylates in which the alkyl group contains 2–8 carbon atoms and particularly ethyl acrylate, butyl acrylate and mixtures thereof. Typical vinylidene monomers which can be interpolymerized in minor amounts with the alkyl acrylates include vinyl chloride, vinylidene chloride, acrylonitrile, methacrylonitrile, alkyl esters of methacrylic acid in which the alkyl group contains 1–8 carbon atoms, and the like. If desired, small quantities of up to about 1.5% of cross-linking monomers may be included in the alkyl acrylate polymers. Cross-linking monomers are monomers containing a plurality of terminal ethylenic groups which are not conjugated in the 1,3 position. Examples of such cross-linking monomers include divinylbenzene, diallyl maleate, diallyl fumarate, diallyl phthalate, etc.

The aqueous dispersion of the rubbery acrylate ester polymer can be prepared in accordance with any of the usual aqueous emulsion polymerization procedures known in the art. In general, the monomers are emulsified in water with the aid of micelle-forming emulsifying agents which are usually compounds containing hydrocarbon groups of 8–22 carbon atoms coupled to highly polar solubilizing groups such as alkali metal and ammonium carboxylate groups, sulfate half ester groups, sulfonate groups, phosphate partial ester groups and the like. Exemplary emulsifying agents include sodium oleate, sodium stearate, the sodium salts of sulfate half esters of fatty alcohols produced by reduction of the fatty acids of natural oils such as coconut oil, sodium abietate, sodium salts of sulfosuccinic esters such as sodium dioctyl sulfosuccinate, sodium salts of alkylated benzene and naphthalene sulfonates such as sodium dodecyl benzene sulfate, sodium salts of monosulfated fatty acid monoglycerides and the like. Such emulsifying agents normally will be employed in the ratio of about 2–7 parts per 100 parts of monomers. The polymerization medium will contain a suitable water-soluble, free radical generating polymerization initiator such as hydrogen peroxide, potassium or sodium persulfates, perborates, peracetates, percarbonates and the like, which polymerization initiators may be associated with activated systems such as redox systems involving versivalent metals and mold reducing agents. The polymerization medium also may contain a chain transfer agent such as a higher alkyl mercaptan of the order of dodecyl mercaptan. The polymerizations can be carried out at temperatures from about 40° C. to about 80° C. or, in the case of activated systems, at temperatures of 0° C. to 80° C.

The graft copolymers of the invention vary in physical nature from stiff rubbers to hard resins. They may be used per se in the manufacture of mold articles or may be employed as stiffening and reinforcing agents in rubber stocks, e.g., in high abrasion resistant shoe sole stocks. The graft copolymers also may be used in the manufacture of glass fiber reinforced thermoplastic laminates of the type described in U.S. 2,805,181.

A prime utility of the graft copolymers lies in the preparation of blends with rigid styrene polymers. The graft copolymer and the rigid styrene polymer are admixed in such proportions that the rubbery acrylate ester polymer substrate of the graft copolymer constitutes about 5–40 or preferably 20–35% by weight of the polymer blend. Such blends can be employed in the manufacture of high strength moldings, in the manufacture of extruded sheets and for the manufacture of high strength articles by other methods well known to the art.

The rigid styrene polymers employed in the polymer blends consist of about 60–100% by weight of styrene, a ring-alkylstyrene or a mixture thereof and, correspondingly, about 40–0% by weight of an alpha-alkylstyrene, an alpha-alkyl-, ring-alkylstyrene, a monoolefin containing 2–4 carbon atoms, a 1,3-acyclic diene hydrocarbon or a mixture thereof. The ring-alkylstyrenes, the alpha-alkylstyrenes, the alpha-alkyl-, ring-alkylstyrenes and 1,3-acyclic diene hydrocarbons that may be included in the rigid styrene polymers are the same as those which may be included in the superstrate of the graft copolymers and which have been set forth earlier herein. Such rigid styrene polymers can be prepared by mass, solution, suspension or emulsion polymerization techniques by methods well known in the art, e.g., see "Styrene Its Polymers Copolymers and Derivatives" by Boundy and Boyer, Reinhold Publishing Company, Waverley Press, Baltimore, Maryland. Preferably, the rigid styrene polymers employed will have a molecular weight of at least about 30,000. In the preferred polymer blends, the monomer composition of the superstrate of the graft copolymer will be substantially identical with the monomer composition of the rigid styrene polymer.

The polymer blends can be prepared by blending latexes of the graft copolymer and the rigid styrene polymer and recovering the polymers from the mixed latexes. Alternatively, the polymer blends can be prepared by comalaxating a mixture of the grid styrene polymer and the graft copolymer at an elevated temperature for a period of time sufficient to prepare an intimate fusion blend of the polymers.

An outstanding characteristic of both the graft copolymers per se and the blends of the graft copolymers with the rigid styrene polymers is that they have outstanding resistance to the deteriorating action of ultraviolet light and/or ozone. Accordingly, these compositions may be employed advantageously in the manufacture of fabricated plastic articles that are to be exposed to outdoor weathering conditions.

If desired, conventional compounding ingredients such as colorants, dyes, pigments, stabilizers, antioxidants, plasticizers and the like may be incorporated in either the graft copolymers per se or in blends of the graft copolymers with rigid styrene polymers.

The above description and particularly the examples are set forth by way of illustration only. Many other variations and modifications of the invention will be apparent to those skilled in the art and can be employed without departing from the spirit and scope of the invention herein described.

What is claimed is:

1. An intimate fusion blend of (A) at least one rigid polymer of 60–100% by weight of a chemically-combined monomer of the group consisting of styrene, a ring-alkyl-styrene, and mixtures thereof and up to 40% by weight of a chemically-combined monomer of the group consisting of an alpha-alkylstyrene, and alpha-alkyl-ring-alkylstyrene, a monoolefin containing 2–4 carbon atoms, a 1,3-acyclic diene hydrocarbon, and mixtures thereof and (B) a graft copolymer prepared by polymerizing about 50–400 parts by weight of a monomer charge consisting of about 70–100% by weight of a monomer of the group consisting of styrene, a ring-alkylstyrene, and mixtures thereof and up to 30% by weight of a monomer of the group consisting of an alpha-alkylstyrene, an alpha-alkyl-ring-alkylstyrene, a 1,3-acyclic diene hydrocarbon, and mixtures thereof in an aqueous dispersion containing 100 parts by weight of a rubbery acrylate polymer which consists of 80–100% by weight of a chemically-combined alkyl acrylate wherein the alkyl radical contains 2–18 carbon atoms and up to 20% by weight of a chemically-combined different monovinylidene monomer; said components A and B being so proportioned that the rubbery acrylate polymer substrate of the graft copolymer constitutes about 5–40% by weight of the blend.

2. A polymer blend as in claim 1 wherein the rubbery acrylate polymer is polyethyl acrylate.

3. A polymer blend as in claim 1 wherein the rubbery acrylate polymer is a copolymer of about 25–75% by weight of ethyl acrylate and 75–25% by weight of butyl acrylate.

4. A polymer blend as in claim 1 wherein the rubbery acrylate polymer is polybutyl acrylate.

5. A polymer blend as in claim 1 in which the rigid polymer is a homopolymer of styrene.

6. A polymer blend as in claim 2 in which the rigid polymer is a homopolymer of styrene.

7. A polymer blend as in claim 3 in which the rigid polymer is a homopolymer of styrene.

8. A polymer blend as in claim 4 in which the rigid polymer is a homopolymer of styrene.

References Cited in the file of this patent

UNITED STATES PATENTS

| | | |
|---|---|---|
| 2,512,697 | TeGrotenhuis | June 27, 1950 |
| 2,614,089 | Harrison et al. | Oct. 14, 1952 |
| 2,802,808 | Hayes | Aug. 13, 1957 |
| 2,840,447 | Green | Jan. 24, 1958 |
| 2,958,673 | Jen | Nov. 1, 1960 |

FOREIGN PATENTS

| | | |
|---|---|---|
| 679,562 | Great Britain | Sept. 17, 1952 |